May 5, 1953 J. GIALANELLA 2,637,475
CARRIER
Filed Dec. 28, 1949
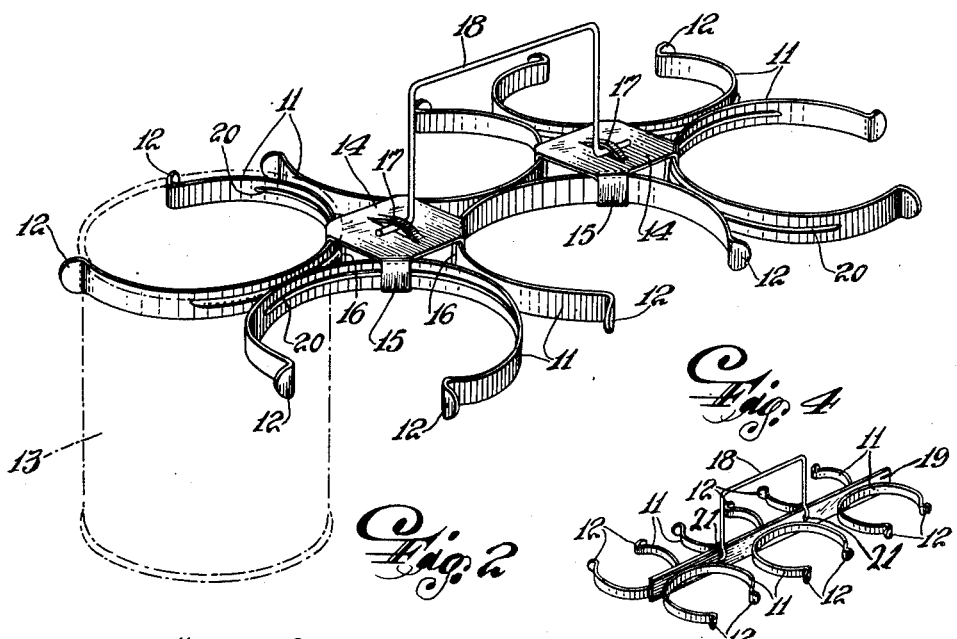
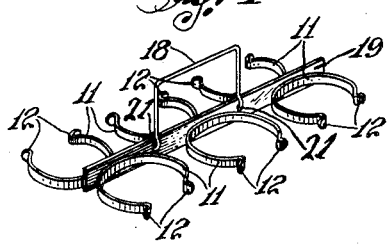
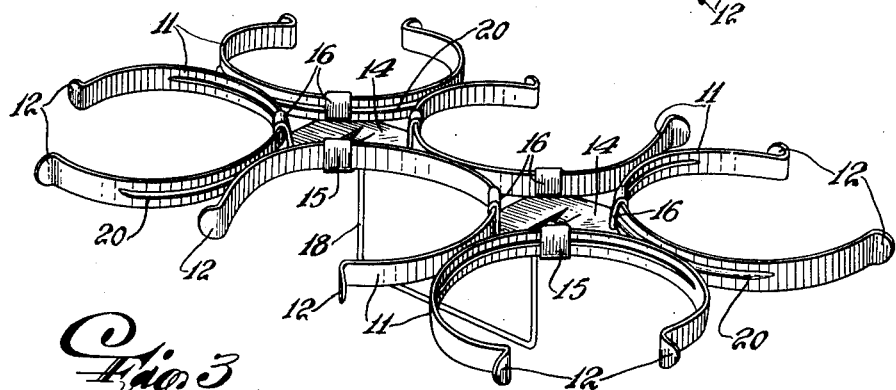
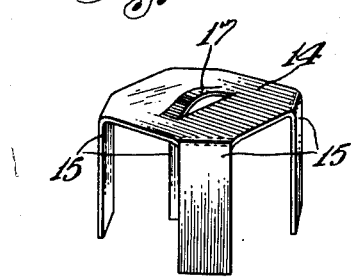
INVENTOR.
Joseph Gialanella
BY Norman N. Popper
ATTORNEY Patented May 5, 1953

2,637,475

UNITED STATES PATENT OFFICE 2,637,475

CARRIER

Joseph Gialanella, Newark, N. J.

Application December 28, 1949, Serial No. 135,338

5 Claims. (Cl. 224—45)

My invention relates generally to a beer can carrier and specifically to such a carrier having many holders for resiliently engaging beer cans.

It is among the objects of my invention to provide a beer can carrier that will conveniently hold beer cans by resilient clips.

It is another object of my invention to provide a beer can carrier that is cheap, folds flat, is small, durable, and easy to construct.

It is yet another object of my invention to provide a simple carrier, that readily receives, can be constructed to carry three or more beer cans, and has few parts. These objects and advantages, may be achieved by the devices illustrated in the drawings, in which:

Figure 1 is a top view in perspective showing my beer can carrier;

Figure 2 is a bottom view in perspective;

Figure 3 is a view in perspective showing the plate; and

Figure 4 is a top view in perspective showing a modified form of my beer can carrier.

Referring now to the drawings in detail, my beer can carrier has six resilient clips 11. These clips are preferably formed of metal and are circular, but have a gap which is approximately one-eighth of their circumference. The ends 12 of the clips are turned over outwardly. They serve to distend the clips 11 when a can of beer 13 is brought against them. The clips 11 should be resilient, so that they will grip beer cans.

The clips 11 are joined together in a group of four by plates 14 which have four legs 15. The legs 15 are bent downward and have their lower ends 16 bent upward to hold the clips 11. The plates have a loop 17 raised in the center to receive a handle 18. The clips 11 may be fastened to the plates 14 in other ways, for example, by welding instead of by the ends 16 being bent over them.

The plates may be united in the form of a bar 19 as shown in Figure 4, and the clips 11 may be welded to it. Holes 21 may be formed in the bar 19 to receive the handle 18. The clips may be supplied with a reinforcing rib to make them more rigid at the center yet permitting flexing toward the end. Such rib 20 should extend no more than one-half of the circumference of the circle delineated by the clips 11.

The clips may be disposed outwardly at an angle of 90° to each other, or, in the case of the bar 19, they may all be disposed perpendicular to the bar. The plate 14 may take many forms and even be in the shape of a bar. The clips may be attached by lugs, welding, or in many other ways. The handle 18 may be a wire bail or an extension of the plate.

It will be seen, therefore, that the foregoing description is merely illustrative of one embodiment of my invention, for many changes may be made in the construction, selection and arrangement of the various parts, all within the scope of the claims, without departing from the spirit of the invention.

I claim:

1. A carrier comprising four resilient arcuate clips, each having outwardly disposed ends, a plate, four legs extending from the plate and each leg attached to one of the four clips, two additional resilient arcuate clips each also having ends in corresponding outward disposition another similar plate having legs attached to two of the clips which were attached to the first plate and to the two additional clips, and a common handle pivotally attached to each of the plates.

2. A carrier comprising a first horizontally disposed plate, legs depending from the plate, an arcuate resilient clip attached to each of the legs with each clip having an outwardly disposed container receiving opening therein adapted to engage a container, a second horizontally disposed plate, with legs depending therefrom, additional clips attached to the second plate, and a common handle pivotally attached to the first and second plates.

3. A carrier comprising a first horizontally disposed plate, legs depending from the plate, an arcuate resilient clip attached to each of the legs with each clip having an outwardly disposed container receiving opening therein adapted to engage a container, a second horizontally disposed plate with legs depending therefrom, additional clips attached to the first and second plates, and a common handle pivotally attached to the first and second plates.

4. A carrier comprising a first horizontally disposed plate, legs depending from the plate, an arcuate resilient clip attached to each of the legs with each clip having an outwardly disposed container receiving opening therein adapted to engage a container, a second horizontally disposed plate with legs depending therefrom, additional clips attached to the first and second plates, and a common handle pivotally attached to the first and second plates whereby the plates may be lifted by the handle and containers embraced by the clips are suspended therefrom.

5. A carrier comprising a first horizontally disposed plate, legs depending from the plate, an arcuate resilient clip attached to each of the legs with each clip disposed horizontally with outwardly disposed container receiving openings therein adapted to engage containers whereby they are suspended therefrom, a second horizontally disposed plate with legs depending therefrom, additional clips attached to the first and second plates and a common handle pivotally attached to the first and second plates.

JOSEPH GIALANELLA.

References Cited in the file of this patent

UNITED STATES PATENTS

| Number | Name | Date |
|---|---|---|
| 1,389,984 | Reed | Sept. 6, 1921 |
| 1,728,512 | Sharp | Sept. 17, 1929 |
| 2,080,947 | Ligeour | May 18, 1937 |
| 2,285,801 | Burnet | June 9, 1942 |
| 2,301,594 | Voigtritter | Nov. 10, 1942 |
| 2,401,578 | Miller | June 4, 1946 |
| 2,559,060 | Zenick | July 3, 1951 |

FOREIGN PATENTS

| Number | Country | Date |
|---|---|---|
| 226,858 | Italy | Aug. 14, 1929 |